Aug. 14, 1962
A. D. ISBELL
3,049,316
LINE TWIST REMOVER FOR SPINNING REELS
Filed Dec. 15, 1960
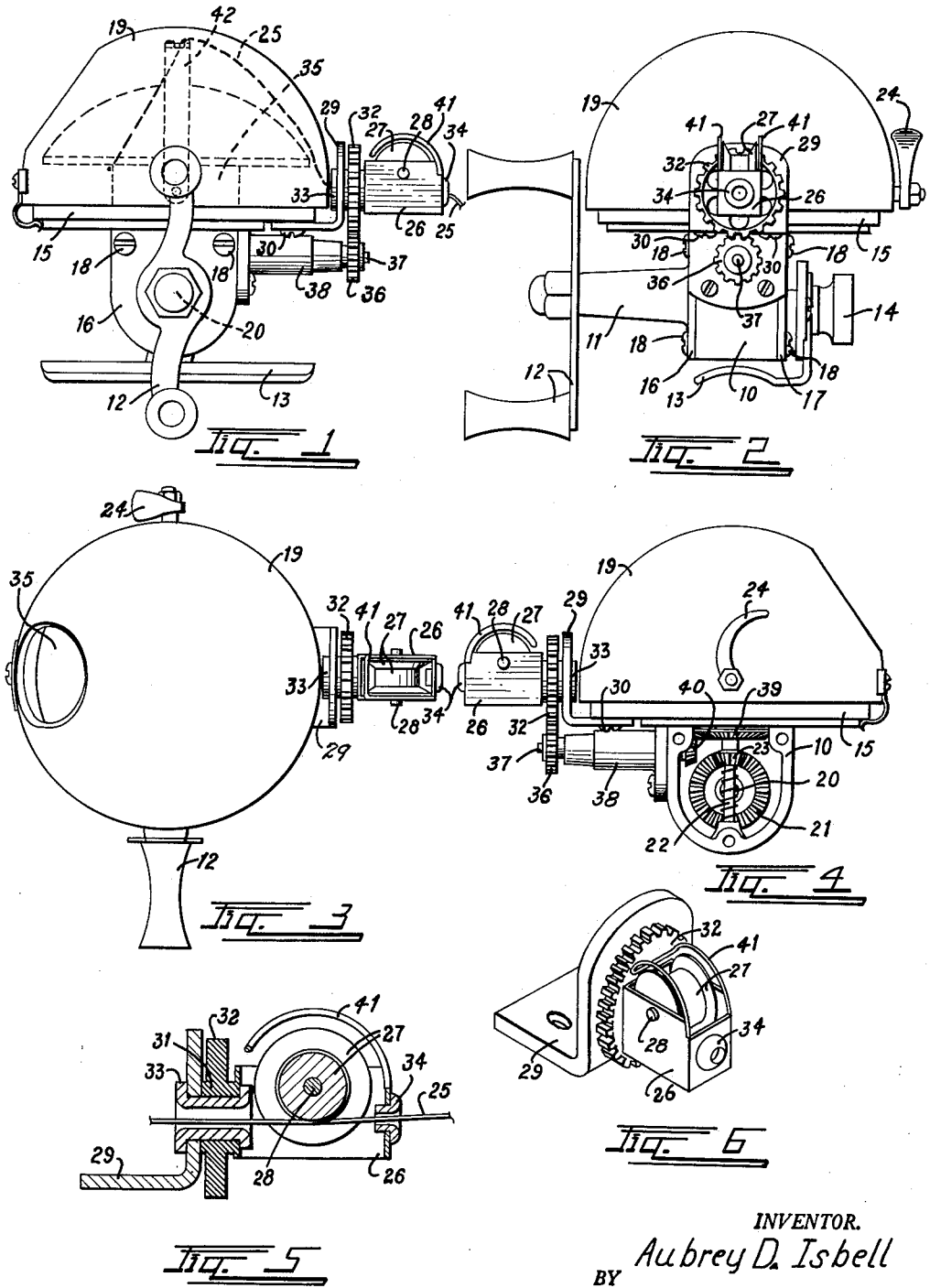
INVENTOR.
Aubrey D. Isbell
BY
ATTORNEY

United States Patent Office 3,049,316
Patented Aug. 14, 1962

3,049,316
LINE TWIST REMOVER FOR SPINNING REELS
Aubrey D. Isbell, 1613 Garfield St., Loveland, Colo.
Filed Dec. 15, 1960, Ser. No. 75,996
6 Claims. (Cl. 242—84.2)

This invention relates to a line twist remover for fishing reels of the spinning type. Spinning reels are designed to enable the fishing line to be rapidly drawn in an axial direction from a stationary line spool. The result is that a 360° twist is imparted to the line for every complete turn of line which is withdrawn from the spool. In making a long cast, an exceedingly large number of line turns are drawn from the spool and, as a result, an exceedingly large number of twists or twisting strains are placed in the line between the bait or lure and the reel. These twists or twisting strains often result in kinking, tangling, and knotting of the line when casting, playing, and retrieving the line.

The principal object of this invention is to provide means which will prevent the damaging twists and twisting strains from being imparted to a fishing line as it is being drawn from the spool of a spinning reel.

Another object is to provide means in a fishing reel which will act to rotate the line about its axis as it is retrieved upon the spool of the reel so that an opposite or counteracting pre-twist will be placed in the reeled line which will be removed as the line is withdrawn axially from the spool so that the discharging line will be unstressed so as to lie normally without any twisting tendencies.

A further object of the invention is to provide a line pre-twisting device which can be applied to conventional spinning reels, of the type in which the line is unwound over the end of the spool and rewound tangentially thereof, to apply a preliminary and opposite twist to the line as it is retrieved on the spool which will be removed when the line is drawn axially from the spool so that the line can be cast from the reel without line twisting tendencies.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a right side elevational view of a type of spinning reel with a line twisting head, to be later described, mounted thereon;

FIG. 2 is a front elevational view thereof;

FIG. 3 is a top view thereof;

FIG. 4 is a left side elevational view of the reel with its left cover plate, to be later described, removed to show interior construction;

FIG. 5 is an enlarged, detail, longitudinal section through the line twisting head; and FIG. 6 is a detail perspective view of the line twisting head.

The invention is applicable to any of the conventional types of spinning reels. For the purpose of illustration, a spinning reel of the type illustrated and described in applicant's co-pending application, Serial No. 810,788, is shown with this invention applied thereto. Conventional reel elements as employed on most types of spinning reels are designated by numerals as follows: gear housing 10, crank shaft bearing 11, hand crank 12, reel seat shoe 13, reel seat attachment screw 14, spool plate 15, right cover plate 16, left cover plate 17, cover plate attachment screws 18, line spool 35, spool cap 19, crank shaft 20, crank shaft bevel gear 21, spool shaft 22, spool shaft bevel pinion 23, bail 42, and bail swing lever 24. The fishing line is indicated at 25.

Briefly, the line 25 is wound onto the spool 35 by forward rotation of the crank 12. Rotation of the crank imparts rotation to the spool shaft 20 and from thence to the spool through the medium of the bevel gear 21 and the intermeshed bevel pinion 23. When it is desired to make a spinning cast, the bail lever 24 is actuated to swing a line guiding bail, such as the bail 42 from a position in the plane of to a position over the axis of the spool 35 so that the line can be withdrawn axially with a whirling motion from the spool while the spool remains stationary. This whirling motion normally imparts a plurality of twists or twisting strains to the discharging line, there being one complete twist in the line for each turn of line pulled from the spool.

This invention is designed to impart a pre-twist to the line 25 as it is retrieved and wound on the spool 35 so that when the line is pulled axially from the stationary spool, the pre-twist will simply be removed so that the line will discharge without twist. Briefly, this is accomplished by positioning what will be herein designated as a twisting head 26 about the line and rotating this head in synchronism with the retrieving rotation of the spool. The head is so connected with the line that the rotations of the head will be imparted to the line.

In the embodiment illustrated, the twisting head 26 comprises a two-sided rectangular hollow box within which a grooved line roller 27 is freely rotatable upon a roller pin 28 mounted in and extending between the two sides of the head 26. The twisting head 26 is rotatably mounted on and forwardly of an L-shaped head bracket member 29 attached to the spool plate 15 in any suitable manner, such as by means of attachment screws 30. The rotatable mounting can be accomplished in any desired manner.

As illustrated, the rear end of the head 26 is provided with a hollow cylindrical gear sleeve 31 affixed thereto and upon which a toothed driven gear 32 is formed. The gear sleeve 31 is rotatably mounted on a flanged tubular shaft 33, mounted in and projecting forwardly from the bracket member 29, so that the head 26 may rotate freely relative to the bracket member 29. A line guide grommet 34 is positioned in the front end of the head 26 in axial alignment with the tubular shaft 33. The line roller 27 is positioned with its circumference tangent to the axes of the grommet 34 and the shaft 33, as shown in FIG. 5.

The twisting head 26 is rotated through the medium of a toothed drive gear 36 which is mounted on the outer extremity of a countershaft 37 journalled in a countershaft bearing 38 secured on the front side of the gear housing 10. The countershaft 37 extends into the gear housing 10 and terminates in a countershaft bevel pinion 40 which meshes with a countershaft bevel drive gear 39 fixedly mounted on the spool shaft 22 above the spool shaft pinion 23. The ratio between the gears and pinions 39 and 40, 32 and 36 is such that the twisting head 26 will rotate at substantially the same speed as the spool shaft 22 and the spool 35.

In use, the line 25 is threaded through the grommet 34 thence once around the line roller 27, thence through the tubular shaft 33 and the bail 42 to an attachment with the line spool 35. Let us assume that the bail is in the retrieve position and that the hand crank is rotated so as to wind the line upon the spool 35 and simultaneously rotate the twisting head 26 about the line. As the line enters to the spool, it will be given one complete twist for each revolution of the spool so that it will lie about the spool in a pretwisted condition. Now let us assume it is desired to make a free spinning cast of the line. The bail swinging lever 24 is actuated to swing the bail 42 to an axial position relative to the spool, as described in applicant's co-pending application, Serial No. 810,788. The cast is now made to cause the line to flow axially outwardly from the spool with the latter spool and the twisting head stationary. As the line flows axially from the spool, it will twist in a direction opposite to the preplaced twist so that it will flow freely from the grommet 34 in its natural untwisted condition.

While a specific form of the improvement has been described and illustrated herein, it is to be understood that the same may be varied within the scope of the appended claims, without departing from the spirit of the invention.

Having thus described the invention what is claimed and desired to be secured by Letters Patent is:

1. A fishing reel comprising: a line spool; a spool shaft upon which said spool is mounted; means for manually rotating said spool shaft to wind a fishing line on said spool; a head member through which said line passes on its way to said spool; means rotatably mounting said head member about the axis of said line; means causing said head member to rotate in unison with said spool shaft; and mean in said head member for causing the rotation of the latter to impart a twist in the line as it travels toward the spool; the means for imparting a twist to the line comprising: a roller mounted in and freely rotatable in said head member about an axis transverse to the axis of said line, said line being wrapped about said roller.

2. A fishing reel as described in claim 1 in which the means for rotating the head member comprises: a drive gear mounted on said spool shaft; a countershaft; a toothed pinion mounted on said countershaft in mesh with said drive gear; and means for transmitting the rotation of said countershaft to said twisting head.

3. A line twisting device for fishing reels of the type in which a fish line is unwound over the end of a stationary spool mounted on a stationary spool support and having means for rotating said spool to rewind said line tangentially comprising: a tubular shaft mounted on said spool support in radial alignment with said spool; a hollow head member rotatably mounted on said tubular shaft; a line grommet mounted in said head in axial alignment with and spaced from said tubular shaft; a freely rotatable line roller mounted in said head member on an axis transverse to the line of said tubular shaft and between said tubular shaft and said line grommet, said fish line passing from said spool axially through said tubular shaft, once around said line roller and thence through said line grommet; and mean for rotating said head member and said line about the axis of said tubular shaft in consequence of the rotation of said spool so as to impart a twist to said line as it enters tangentially onto said spool.

4. A line twisting device for fishing reels as described in claim 3 in which the line roller is positioned with its circumference tangent to the common axis of the tubular shaft and the line grommet.

5. A line twisting device as described in claim 4 in which the means for rotating said head member comprises a driven gear concentrically and rotatably mounted on said tubular shaft and secured to said head member and means for rotating said driven gear from the means for rotating said spool.

6. The combination with a fishing reel, of the type in which a fish line is unwound over the end of a spool while the latter is stationary and rewound by rotating said spool, of a rotatable line twisting head mounted on said reel, a freely rotatable roller in said head, and means for rotating said head as said line rewinds on said spool, said line passing about said roller and completely through said head.

References Cited in the file of this patent

UNITED STATES PATENTS

| 1,724,200 | Hubbard | Aug. 13, 1929 |
| 2,979,281 | Shafer | Apr. 11, 1961 |

FOREIGN PATENTS

| 335,568 | Switzerland | Feb. 28, 1959 |